United States Patent
Yang et al.

(10) Patent No.: US 12,037,551 B2
(45) Date of Patent: Jul. 16, 2024

(54) LIQUID-PHASE REACTOR AND APPLICATION THEREOF

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Xiuna Yang, Liaoning (CN); Feng Zhou, Liaoning (CN); Zonglin Ruan, Liaoning (CN); Jia He, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 210 days.

(21) Appl. No.: 17/755,230

(22) PCT Filed: Oct. 22, 2020

(86) PCT No.: PCT/CN2020/122683
§ 371 (c)(1),
(2) Date: Apr. 25, 2022

(87) PCT Pub. No.: WO2021/078186
PCT Pub. Date: Apr. 29, 2021

(65) Prior Publication Data
US 2022/0411704 A1 Dec. 29, 2022

(30) Foreign Application Priority Data
Oct. 25, 2019 (CN) .......................... 201911020744.9

(51) Int. Cl.
*C10G 65/02* (2006.01)
*B01J 8/06* (2006.01)

(52) U.S. Cl.
CPC .............. *C10G 65/02* (2013.01); *B01J 8/065* (2013.01); *B01J 2208/00884* (2013.01);
(Continued)

(58) Field of Classification Search
CPC ............ C10G 65/02; C10G 2300/1077; C10G 2300/202; C10G 2300/205;
(Continued)

(56) References Cited

U.S. PATENT DOCUMENTS

| 3,278,420 A | 10/1966 | Jaeger |
| 4,615,870 A | 10/1986 | Armstrong et al. |

(Continued)

FOREIGN PATENT DOCUMENTS

| CN | 200949094 Y | 9/2007 |
| CN | 101942325 A | 1/2011 |

(Continued)

OTHER PUBLICATIONS

Translation of CN 104549066 (Year: 2015).*

Primary Examiner — Randy Boyer
Assistant Examiner — Juan C Valencia
(74) Attorney, Agent, or Firm — NKL Law; Allen Xue

(57) ABSTRACT

A liquid-phase reactor has an outer cylinder and an inner cylinder disposed along an axial direction of the reactor. The outer cylinder has a top head, a straight cylinder section and a bottom head. An annular space is formed between the inner cylinder and the outer cylinder. A top end of the inner cylinder is open and is in communication with the annular space. The inner cylinder has an upper cylinder and a lower cylinder sequentially from top to bottom. The upper cylinder is positioned in the straight cylinder section, with its cross- (Continued)

sectional area being gradually reduced from top to bottom. The lower cylinder is positioned in the bottom head, with its cross-sectional area being gradually increased from top to bottom. An inorganic membrane tube extending along the axial direction of the reactor is provided in the lower cylinder so that a shell-and-tube structure is formed.

20 Claims, 3 Drawing Sheets

(52) U.S. Cl.
CPC .......... *C10G 2300/1077* (2013.01); *C10G 2300/202* (2013.01); *C10G 2300/205* (2013.01); *C10G 2300/206* (2013.01); *C10G 2300/301* (2013.01); *C10G 2300/302* (2013.01); *C10G 2300/308* (2013.01)

(58) Field of Classification Search
CPC ........ C10G 2300/206; C10G 2300/301; C10G 2300/302; C10G 2300/308; C10G 67/00; C10G 2300/4006; C10G 2300/4012; C10G 2300/4018; C10G 45/02; C10G 49/00; B01J 8/065; B01J 2208/00884; B01J 8/22; B01J 8/34; B01J 2208/0061; B01J 2208/00911; B01J 2208/025; B01J 8/44; B01J 8/04; B01J 8/0492; B01J 8/0496

See application file for complete search history.

(56) References Cited

U.S. PATENT DOCUMENTS

| | | | |
|---|---|---|---|
| 9,222,924 B1 * | 12/2015 | Panchal | .............. B01J 8/10 |
| 2009/0159537 A1 | 6/2009 | Kemoun | |
| 2014/0001095 A1 | 1/2014 | Korsten | |
| 2019/0233742 A1 | 8/2019 | Ackerson et al. | |

FOREIGN PATENT DOCUMENTS

| | | | |
|---|---|---|---|
| CN | 202063881 U | | 12/2011 |
| CN | 101632911 B | | 5/2012 |
| CN | 104549066 A | * | 4/2015 |
| CN | 104927910 A | | 9/2015 |
| CN | 105727845 A | | 7/2016 |
| CN | 108659882 A | | 10/2018 |
| CN | 109306272 A | | 2/2019 |
| CN | 109731532 A | | 5/2019 |
| RU | 2655382 C2 | | 5/2018 |
| RU | 2685266 C1 | | 4/2019 |

\* cited by examiner

LIQUID-PHASE REACTOR AND APPLICATION THEREOF

CROSS REFERENCE TO RELATED APPLICATIONS

This application is a U.S. national stage entry of PCT international application no. PCT/CN2020/122683, filed Oct. 22, 2020, which claims priority from Chinese patent application No. 201911020744.9, titled "heavy oil hydrogenation reactor and hydrogenation process", filed on Oct. 25, 2019, the contents of which are incorporated herein by reference in their entirety.

TECHNICAL FIELD

The present application relates to the field of liquid phase catalytic reaction, particularly to a liquid-phase reactor and application thereof.

BACKGROUND ART

With the intensified trend of becoming heavier and inferior of crude oils, components of crude oil are getting heavier and heavier, that is, the proportion of heavy crude oil is getting higher and higher. Therefore, the progress of heavy oil hydrotreating technology becomes one of the key researches of hydrogenation process. There are several types of heavy oil hydrogenation reactors, such as fixed bed hydrogenation reactors, suspension bed hydrogenation reactors, fluidized bed hydrogenation reactors and the like, among which the application of the fixed bed hydrogenation reactors is the most extensive. Up-flow fixed bed reactor can be used to treat various types of heavy oil products, and has unique advantages in oil hydrogenation process. For example, since there is a high impurity content in inferior oil product such as residual oil and coal liquefied oil, hydrogenation catalyst poisoning or rapid inactivation may be encountered due to the blockage of the pores in the catalyst, and the pressure drop may rapidly increase where the bed layer is blocked by the impurities, so that the working condition of the reactor becomes poor, even a normal operation cannot be realized. However, if an up-flow hydrogenation reaction process is adopted, the co-current upward movement of gas and liquid may cause an expansion of the catalyst bed layer, so that the void ratio of the bed layer can be increased, and the blockage of the catalyst bed layer can be avoided.

In heavy oil hydrogenation process, compared with traditional fixed bed gas/liquid/solid three-phase hydrogenation process, liquid-phase hydrogenation process has the advantages of high hydrogenation rate, high reaction efficiency, low energy consumption, low investment etc., and is widely accepted and applied. Up-flow liquid-phase hydrogenation process integrates the advantages of up-flow hydrogenation reactor and liquid-phase hydrogenation process, and thus has some advantages when applied to hydrogenation processes. However, the following problems still exist in heavy oil liquid-phase hydrogenation reactor and reaction process: (1) the heavy oil has high viscosity, and the hydrogen-oil mass transfer rate is low, so that the reaction rate is low; (2) the residence time in the heavy oil hydrogenation process is difficult to control, but a short residence time may be not sufficient to achieve a desired reaction degree, while a long residence time may cause serious side reaction or cracking, and coking of catalyst.

CN 109306272A discloses a heavy oil hydrotreating system, comprising a main reactor and at least one sub-reactor, wherein the main reactor comprises a first cylinder for holding materials, and the sub-reactor comprises: a mixing unit for mixing the material and hydrogen, which comprises a second cylinder and a promoting device, wherein the second cylinder is provided with a material inlet, a hydrogen inlet and a first outlet, and the material inlet is in communication with the outlet of the first cylinder; and an inlet of the promoting device is in communication with the first outlet of the second cylinder, an outlet of the promoting device is in communication with the accommodating cavity of the first cylinder, and the promoting device is provided for supplying energy to the material to enable a cracking reaction of the material.

CN 108659882A discloses a heavy oil hydrogenation process and hydrogenation system, wherein the heavy oil hydrogenation process comprises: mixing a heavy oil, a cycle oil, a vulcanizing agent and a catalyst, and hydrocracking the mixture in the presence of hydrogen in a first reactor to obtain a first reaction product; recycling a part of the materials of the first reaction product to the first reactor, and hydrocracking the rest of the materials in a second reactor to obtain a second reaction product; separating the second reaction product into a light component and a heavy component, recycling a part of the heavy component to the second reactor, and separating the rest of the heavy component to obtain a distillate oil as the cycle oil; and hydrofining the light components in a third reactor to obtain light oil products. The process mainly aims to improve the heat transfer efficiency and the mass transfer efficiency, ensure a sufficient residence time of materials in the reactor and improve the heavy oil conversion rate and the light oil yield. But, since only a hydrogenation reactor having a conventional structure is used, the contact time of the catalyst and the feedstock cannot be effectively controlled, and the heavy oil conversion rate and the light oil yield cannot be ensured.

CN202063881U discloses a liquid-phase hydrogenation reactor, in which a mixer is provided in a top head of the reactor, which has a mixed oil inlet, a hydrogen inlet, a hydrogen-dissolved mixture outlet and a gas outlet, and the hydrogen-dissolved mixture outlet is inserted into the liquid phase of the reactor. The purpose of this patent is to increase the gas-liquid phase contact area, make hydrogen dissolve in the miscella, and to improve hydrogenation efficiency through the structure of the hydrogen mixer in the reactor.

CN101632911B disclose an up-flow reactor and its application, the up-flow reactor comprising an initial distributor located at the bottom of the reactor and an intermediate distributor above the initial distributor, wherein the initial distributor is composed of a conical baffle plate and a sieve plate located above the conical baffle plate; the middle distributor is composed of an open-pore sieve plate and a sieve plate string structure, and the up-flow reactor aims to realize uniform distribution of gas so as to improve the utilization of the catalyst.

In summary, most heavy oil hydrogenation reactors and up-flow liquid-phase hydrogenation reactors in the prior art are aims at improving the hydrogenation reaction efficiency by improving the process of existing plants, adopting a new hydrogen dissolving equipment or a method for dissolving hydrogen for multiple times. But, the problems of low reaction rate, insufficient conversion degree, and uneven temperature rise, as well as the problems of low liquid yield, serious side reaction and cracking, and the like caused by long residence time, encountered in the heavy oil liquid-phase hydrogenation process are still not solved.

SUMMARY OF THE INVENTION

In order to overcome the defects of the prior art, the present application aims to provide a novel liquid-phase reactor and application thereof, wherein the reactor adopts a specially designed inner and outer double cylinder structure, which is beneficial to reducing the viscosity of liquid-phase reaction material, and improving the mass transfer driving force and the reaction rate of liquid-phase reaction, and thus is suitable for the liquid-phase reaction of high-viscosity liquid materials, particularly for the liquid-phase catalytic hydrogenation reaction of heavy oils.

In order to achieve the above object, the present application provides, in an aspect, a liquid-phase reactor, comprising an outer cylinder, and an inner cylinder disposed along an axial direction of the reactor, wherein the outer cylinder comprises a top head, a straight cylinder section and a bottom head, an annular space is formed between the inner cylinder and the outer cylinder, a top end of the inner cylinder is open and is in communication with the annular space, and the liquid-phase reactor is characterized in that: the inner cylinder comprises an upper cylinder and a lower cylinder sequentially from top to bottom, wherein,

- the upper cylinder is positioned in the straight cylinder section, with its cross-sectional area being gradually reduced from top to bottom, its top end being open, and its bottom being in communication with the top of the lower cylinder;
- the lower cylinder is positioned in the bottom head, with its cross-sectional area being gradually increased from top to bottom, and its bottom end being hermetically connected to the inner wall of the bottom head, an inorganic membrane tube extending along the axial direction of the reactor is provided in the lower cylinder, so that a shell-and-tube structure is formed, and pores are provided in the tube wall of the inorganic membrane tube as a gas passage;
- the bottom head is provided with a liquid inlet, a gas inlet and a product outlet, with the liquid inlet and the gas inlet being in communication with the bottom of the lower cylinder, and the product outlet being in communication with the bottom of the annular space, wherein the liquid inlet is in communication with one of the shell side and the tube side of the shell-and-tube structure of the lower cylinder, while the gas inlet is in communication with the other of the shell side and the tube side of the shell-and-tube structure.

Preferably, the liquid inlet is in communication with the shell side of the shell-and-tube structure of the lower cylinder, and the gas inlet is in communication with the tube side of the shell-and-tube structure.

Preferably, the upper cylinder is filled with a first catalyst, and the annular space is filled with a second catalyst which may be the same as or different from the first catalyst.

In another aspect, the present application provides a process for the hydrogenation of heavy oils using the liquid-phase reactor according to the present application, comprising the steps of:

(1) feeding a heavy oil feedstock via the liquid inlet to the shell side of the shell-and-tube structure of the lower cylinder, and introducing a hydrogen gas via the gas inlet to the tube side of the shell-and-tube structure, to produce a hydrogen-containing reaction material having a reduced viscosity as compared to the heavy oil feedstock at the top of the lower cylinder, optionally, the heavy oil feedstock has been pre-mixed with hydrogen;

(2) passing the reaction material to the bottom of the upper cylinder, and subjecting it to a first hydrogenation reaction during the process of passing through the upper cylinder from bottom to top in the presence of a first hydrogenation catalyst filled therein to obtain a partially hydrogenated reaction material;

(3) passing the partially hydrogenated reaction material to the annular space, and subjecting the partially hydrogenated reaction material to a second hydrogenation reaction during the process of passing through the annular space from top to bottom in the presence of a second hydrogenation catalyst filled therein to obtain a hydrogenated reaction product, wherein the second hydrogenation catalyst is the same as or different from the first hydrogenation catalyst.

In the liquid-phase reactor of the present application, the lower cylinder having a shell-and-tube structure can serve to reduce the viscosity of the material, in which the gas material can diffuse into the liquid material through the pores provided in the tube wall of the inorganic membrane tube, apply a shearing action on the liquid material, and uniformly disperse/dissolve into the liquid material to reduce its viscosity. For example, when the gas material is passed into the tube side of the shell-and-tube structure (i.e. into the inorganic membrane tube) and the liquid material is passed into the shell side of the shell-and-tube structure (i.e. into the space formed between the tube wall of the inorganic membrane tube and the wall of the lower cylinder), the gas material will diffuse from inside the inorganic membrane tube to the space outside through the pores provided in the tube wall of the inorganic membrane tube, so that a driving force from inside to outside is generated, and after the liquid material is passed into the space of the shell side, since the cross-sectional area of the lower cylinder is gradually reduced from bottom to top, a driving force towards the center of the top end of the lower cylinder is generated, so that the diffused gas material can apply a relative large shearing force to the liquid material, which on one hand greatly improves the dissolution and dispersion amount and dispersion uniformity of the gas material in the liquid material and reduces the viscosity of the resulted reaction material, and on the other hand, with the action of the diffusion gas, allows a more uniform mixing between macromolecules and micromolecules in the reaction material, and improves the fluidity of the material, thereby further reducing the viscosity of the materials. In addition, in the liquid-phase reactor of the present application, the reaction material with a large amount of gas dissolved and dispersed therein is passed into the upper cylinder, and during the reaction therein, the gas gradually diffuses from inside the body of the liquid phase to its outer surface due to the gradually increasing cross-sectional area of the upper cylinder, which also has an effect of improving the fluidity of the reaction material. Accordingly, by using the reactor of the present application, an effect in reducing the viscosity of the reaction material and improving the fluidity of the reaction material can be achieved during the feeding process and the entire liquid-phase reaction process, which is beneficial to improving the mass transfer driving force and the reaction rate of the liquid-phase reaction.

In the process for hydrogenation of heavy oils of the present application, by subjecting the reaction material to catalytic hydrogenation reaction while sequentially passing through the upper cylinder and the annular space after the reduction of its viscosity in the lower cylinder of the reactor according to the present application, the mass transfer driving force and reaction rate of the liquid-phase hydrogenation reaction of the heavy oil can be improved, the contact time between the reaction material and the catalyst (especially catalysts with different activities) can be controlled, coking on the surface of the catalysts can be mitigated, deep cracking of light oil can be reduced, and the liquid yield and the impurity removal conversion rate of heavy oil of the liquid-phase hydrogenation process of the heavy oil can be improved.

BRIEF DESCRIPTION OF THE DRAWINGS

The drawings, forming a part of the present description, are provided to help the understanding of the present application, and should not be considered to be limiting. The present application can be interpreted with reference to the drawings in combination with the Detailed Description hereinbelow. In the drawings.

Figure 1:
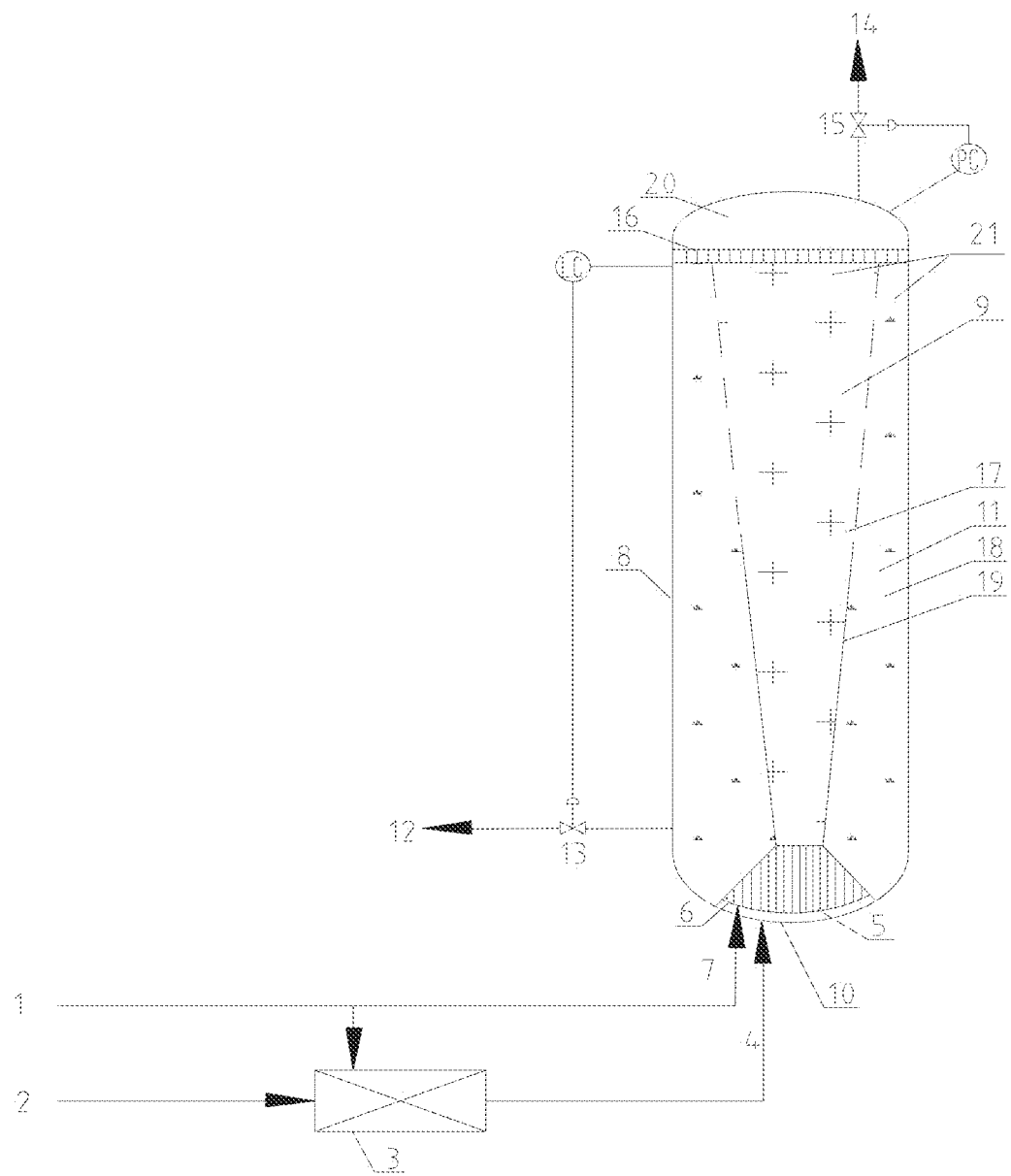
FIG. 1 shows a schematic diagram of a preferred embodiment of the liquid-phase reactor and heavy oil hydrogenation process of the present application.

1—hydrogen, 2—heavy oil feedstock, 3—hydrogen-oil mixer, 4—liquid feeding, 5—lower cylinder, 6—inorganic membrane tube, 7—gas feeding, 8—straight cylinder section, 9—upper cylinder, 10—bottom head, 11—annular space, 12—reaction product, 13—discharge valve, 14—discharge gas, 15—vent valve, 16—grid, 17—first hydrogenation catalyst, 18—second hydrogenation catalyst, 19—upper cylinder wall, 20—gas space and 21—liquid space.

DETAILED DESCRIPTION OF THE INVENTION

The present application will be further described hereinafter in detail with reference to specific embodiments thereof and the accompanying drawings. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, such as any possible value within ±5% of the exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the terms "upper" and "lower" refer to upper and lower positions, respectively, along the axial direction of the reactor.

In the present application, the term "inorganic membrane tube" has the same meaning well known in the art and generally refers to a tubular semipermeable membrane made of an inorganic material, which may be, for example, an inorganic ceramic membrane tube. The diameter and wall thickness of the inorganic membrane tube are not particularly limited herein, and typically the diameter may be about 2-50 mm, the wall thickness may be about 0.1-5 mm, and a plurality of inorganic membrane tubes may be integrated into one tube bundle.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

All of the patent and non-patent documents cited herein, including but not limited to textbooks and journal articles, are hereby incorporated by reference in their entirety.

As described above, in a first aspect, the present application provides a liquid-phase reactor, comprising an outer cylinder, and an inner cylinder disposed along an axial direction of the reactor, wherein the outer cylinder comprises a top head, a straight cylinder section and a bottom head, an annular space is formed between the inner cylinder and the outer cylinder, a top end of the inner cylinder is open and is in communication with the annular space, and the liquid-phase reactor is characterized in that: the inner cylinder comprises an upper cylinder and a lower cylinder sequentially from top to bottom, wherein, the upper cylinder is positioned in the straight cylinder section, with its cross-sectional area being gradually reduced from top to bottom, its top end being open, and its bottom being in communication with the top of the lower cylinder;

the lower cylinder is positioned in the bottom head, with its cross-sectional area being gradually increased from top to bottom, and its bottom end being hermetically connected to the inner wall of the bottom head, an inorganic membrane tube extending along the axial direction of the reactor is provided in the lower cylinder, so that a shell-and-tube structure is formed, and pores are provided in the tube wall of the inorganic membrane tube as a gas passage;

the bottom head is provided with a liquid inlet, a gas inlet and a product outlet, with the liquid inlet and the gas inlet being in communication with the bottom of the lower cylinder, and the product outlet being in communication with the bottom of the annular space, wherein the liquid inlet is in communication with one of the shell side and the tube side of the shell-and-tube structure of the lower cylinder, while the gas inlet is in communication with the other of the shell side and the tube side of the shell-and-tube structure.

According to the present application, the lower cylinder of the reactor has a shell-and-tube structure, in which the tube side corresponds to the inner space of the inorganic membrane tube and the shell side corresponds to the space formed between the tube wall of the inorganic membrane tube and the wall of the lower cylinder.

In a preferred embodiment, the liquid inlet of the liquid-phase reactor is in communication with the shell side of the shell-and-tube structure of the lower shell and the gas inlet of the liquid-phase reactor is in communication with the tube side of the shell-and-tube structure.

In the liquid-phase reactor of the present application, the reaction material moves upwards from bottom to top in the upper cylinder, diffuses to the annular space through the top head, and then moves downwards from top to bottom in the annular space.

In some preferred embodiments, the upper middle part of the wall of the upper cylinder, preferably at a distance from the bottom end of the upper cylinder of at least about ⅓, preferably about ½, of the total vertical height of the upper cylinder, is provided with a plurality of openings, typically with an opening ratio of about 30-95%, preferably about 55% to 75%, relative to the area of the part of the wall with openings. The shape of the opening is not particularly limited, and may be, for example, one or more shapes selected from rectangles, squares, diamonds, circles, hexagons, and the like, preferably circle. The aperture size of the openings (e.g. the diameter of inscribed circle for non-circular openings) is typically from about 0.1 mm to about 50 mm, preferably from about 5 mm to about 15 mm. In such preferred embodiments, a part of the reaction material in the upper cylinder can diffuse through the openings in the wall of the upper cylinder into the annular space, thereby reducing the residence time of the reaction material in the upper cylinder to some extent and avoiding undesirable side reactions. For example, when used in the heavy oil hydrogenation process of the present application, the residence time of the heavy oil feedstock on the surface of the highly active catalyst filled in the upper cylinder can be limited to avoid an excessively long residence time, thereby achieving a desired conversion degree, while reducing side reactions and cracking reactions, which in turn can improve the liquid yield.

In a further preferred embodiment, the ratio of the vertical height of the part of the wall with openings of the upper cylinder to the total vertical height of the upper cylinder is from about 1:1.5 to about 1:20, preferably from about 1:2 to about 1:8.

In a preferred embodiment, the upper cylinder has a frustoconical shape with a cross-sectional area gradually decreasing from top to bottom, with a ratio of its maximum cross-sectional diameter to the diameter of the reactor being about 1:1.05 to about 1:50, preferably about 1:1.5 to about 1:5, and a ratio of its minimum cross-sectional diameter to its maximum cross-sectional diameter being about 1:1.1 to about 1:30, preferably about 1:2 to about 1:10.

In a further preferred embodiment, the lower cylinder has a frustoconical shape with a cross-sectional area gradually decreasing from bottom to top, with a ratio of its maximum cross-sectional diameter to the diameter of the reactor being about 1:1.05 to about 1:50, preferably about 1:1.15 to about 1:5, and a ratio of its minimum cross-sectional diameter to its maximum cross-sectional diameter being about 1:1.1 to about 1:30, preferably about 1:2 to about 1:10.

In the liquid-phase reactor of the present application, the lower cylinder can serve as a viscosity reducing component, the shell side of the shell-and-tube structure of the lower cylinder is in communication with one of the liquid inlet and the gas inlet of the reactor, and the tube side of the shell-and-tube structure is in communication with the other of the liquid inlet and the gas inlet of the reactor, wherein the tube wall of the inorganic membrane tube is provided with pores, so that the gas on the shell side or the tube side can diffuse to the space on the other side through the pores, thereby reducing the viscosity of the liquid material on the other side. Preferably, the pores provided in the tube wall of the inorganic membrane tube have an average pore size of about 0.5-200 nm, so that the gas bubbles diffused through the pores have an average size of about 10-1000 nm, preferably about 50-500 nm.

In a preferred embodiment, the upper cylinder and/or the annular space is filled with a catalyst. Further preferably, the upper cylinder is filled with a first catalyst, such as a first hydrogenation catalyst, and the annular space is filled with a second catalyst, such as a second hydrogenation catalyst, wherein the first catalyst and the second catalyst may be the same or different. Particularly preferably, the first catalyst has a higher catalytic activity than the second catalyst, e.g. the first hydrogenation catalyst has a higher hydrogenation activity than the second hydrogenation catalyst.

In a preferred embodiment, a gas space is provided at the top of the outer cylinder of the reactor (i.e., inside the top head), and the top head of the reactor is provided with a gas outlet (e.g., at the highest position of the top head) for continuously or intermittently discharging gas from the reaction system during the reaction.

In a preferred embodiment, a grid is provided between the top end of the upper cylinder and the top head of the reactor for fixing the catalyst bed layer in the upper cylinder, blocking the catalyst from entering the space in the top head but allowing the reaction material to pass through. There is no particular limitation on the structure of the grid in the present application, as long as it can achieve the above function. In some particular embodiments, the grid may be a plate made of grid bars, Johnson mesh, or the like.

In a second aspect, the present application provides a process for the hydrogenation of heavy oils using the liquid-phase reactor according to the present application, comprising the steps of:

(1) feeding a heavy oil feedstock via the liquid inlet to the shell side of the shell-and-tube structure of the lower cylinder, and introducing a hydrogen gas via the gas inlet to the tube side of the shell-and-tube structure, to produce a hydrogen-containing reaction material having a reduced viscosity as compared to the heavy oil feedstock at the top of the lower cylinder, optionally, the heavy oil feedstock has been pre-mixed with hydrogen;

(2) passing the reaction material to the bottom of the upper cylinder, and subjecting it to a first hydrogenation reaction during the process of passing through the upper cylinder from bottom to top in the presence of a first hydrogenation catalyst filled therein to obtain a partially hydrogenated reaction material;

(3) passing the partially hydrogenated reaction material to the annular space, and subjecting it to a second hydrogenation reaction during the process of passing through the annular space from top to bottom in the presence of a second hydrogenation catalyst filled therein to obtain a hydrogenated reaction product, wherein the second hydrogenation catalyst is the same as or different from the first hydrogenation catalyst.

In a preferred embodiment, the volume ratio of the amount of hydrogen fed ($Nm^3/h$) to the amount of heavy oil feedstock fed ($m^3/h$), also referred to herein as hydrogen-to-oil volume ratio or hydrogen-to-oil ratio, in step (1) is from about 1500:1 to about 1:1, preferably from about 500:1 to about 1:1.

In some preferred embodiments, the reactor discharge is controlled by the level of liquid in the upper part of the reactor so as to ensure that the hydrogenation process is a full liquid-phase hydrogenation.

In a preferred embodiment, the conditions of the first hydrogenation reaction include: a reaction temperature of about 60-500° C., preferably about 320-460° C.; a reaction pressure of about 0.5-20.0 MPa, preferably about 6.0-15.0 MPa; a liquid hourly volume space velocity of a fresh feed of about 0.01-10.0 h$^{-1}$, preferably about 0.1-2.0 h$^{-1}$.

In a further preferred embodiment, the conditions of the second hydrogenation reaction include: a reaction temperature of about 120-550° C., preferably about 350-500° C.; a reaction pressure of about 0.5-20.0 MPa, preferably about 6.0-15.0 MPa; a liquid hourly volume space velocity of a fresh feed of about 0.1-10.0 h$^{-1}$, preferably about 0.5-5.0 h$^{-1}$.

According to the present application, the heavy oil may be various types of heavy oil products, for example, heavy oil with a specific gravity of more than or equal to 0.91, high viscosity and poor fluidity, such as vacuum residue, wax oil, coal tar, lubricating oil, anthracene oil, deasphalted oil, biodiesel, animal oil or vegetable oil.

According to the present application, the heavy oil feedstock pre-mixed with hydrogen is generally obtained by mixing through a hydrogen-oil mixer, such as a static mixer, a dissolved air pump, a colloid mill, a microporous plate nano/micron hydrogen dispersion assembly, a ceramic membrane nano/micron hydrogen dispersion assembly, and the like, with a gas-liquid mixing function. In a preferred embodiment, in the heavy oil feedstock premixed with hydrogen, the hydrogen is typically present in an amount of about 0.01-20 wt %, preferably about 2.0-8.0 wt %, based on the mass of the heavy oil feedstock.

In a preferred embodiment, the activity of the first hydrogenation catalyst is higher than the second hydrogenation catalyst, preferably the ratio of the activity of the first hydrogenation catalyst to the activity of the second hydrogenation catalyst is from about 1.05:1 to about 10:1. Said activity is directed to the chemical reaction in the upper cylinder and the annular space and is expressed in an amount of the feedstock reactant converted per unit volume (or mass) of catalyst per unit time, and the catalytic activity can be selected or regulated in the preparation process through the specific surface area of the catalyst carrier, the nature of active centers on the surface, the amount of active centers per unit surface area, and the like. The activity of the catalyst is evaluated as follows: under the same feedstock composition and reaction conditions, the same volume of catalysts are used for hydrogenation reaction in the same device, the compositions of the products are determined after the same residence time, and the conversion rates are calculated and compared, of which the results are used as the basis for judging whether the activity is high or low.

According to the present application, the first and second hydrogenation catalysts can be selected from proper hydrogenation catalysts according to the needs of the reaction so as to realize different hydrogenation purposes. For example, the first and second hydrogenation catalysts may each be independently selected from hydrofining catalysts, pre-hydrofining catalysts, hydro-upgrading catalysts, selective hydrogenation catalysts, hydrotreating catalysts, hydrocracking catalysts, supplementary hydrogenation catalysts, and the like, which may be commercial catalysts, catalysts conventionally used in the art, or catalysts prepared according to methods known in the art. For example, the first hydrogenation catalyst and the second hydrogenation catalyst can be, independently from each other, those catalysts used in existing heavy oil hydrogenation plants, such as 3936, 3996, FF-16, FF-24, FF-26, FF-36, FF-46, FF-56 hydrotreating catalysts developed by Fushun Research Institute of Petroleum and Petrochemical, HC-K, HC-P catalysts of UOP Company, TK-555, TK-565 catalysts of Topsoe Company, and KF-847, KF-848 catalysts of Akzo Company.

According to the present application, the first and second hydrogenation catalysts may each independently comprise a carrier and an active component, for example, the carrier may be present in an amount of about 45-95 wt % and the active component may be present in an amount of about 5-55 wt %, based on the total weight of the hydrogenation catalyst, wherein the active component is preferably one or more selected from Group VIB and Group VIII metal elements, and the carrier is preferably alumina and/or silicon-containing alumina. Further preferably, the Group VIB metal elements are typically Mo and/or W and the Group VIII metal elements are typically Co and/or Ni. In a particularly preferred embodiment, the first and second hydrogenation catalysts each independently comprise about 5-40 wt % of a Group VIB metal element and about 3-15 wt % of a Group VIII metal element, calculated as oxides and based on the weight of the hydrogenation catalyst.

In a preferred embodiment, the first hydrogenation catalyst filled in the upper cylinder has a higher activity than the second hydrogenation catalyst filled in the annular space, and the annular space may be filled with a hydrogenation catalyst having an activity that is fully or partially lower than that of the catalyst in the upper cylinder.

The catalytic reaction of the present application can fully or partially remove the impurities such as sulfur, nitrogen, oxygen, arsenic, metal, carbon residue and the like in the hydrocarbon feedstock, or saturate/partially saturate olefins, aromatics and dienes, or allow reactions such as isomerization, alkylation, cyclization, aromatization, cracking and the like of hydrocarbon molecules. Typical hydrogenation reaction process of heavy oils has the following characteristics: 1) heavy oils have the characteristics of large density and viscosity, and due to the large interfacial mass transfer resistance between hydrogen and oil, the hydrogenation process has the defects of low reaction rate and insufficient impurity removal degree; 2) if the residence time in the hydrogenation reaction process of the heavy oil is too short, a desired conversion degree may not be achieved, but if the residence time is too long, serious side reactions and cracking reactions may occur and a low liquid yield may be obtained; 3) in the early stage of the hydrogenation reaction where the concentration of impurity components in the feedstock is the highest, the driving force of the hydrogenation reaction is large; and 4) the higher the temperature is, the easier the coking is formed on the surface of the catalyst by the material, and more serious the cracking reaction is, but the temperature in the hydrogenation reaction process of heavy oils, especially the temperature in the later stage thereof, is very high, so that the cracking reaction in the later stage of the reaction process is very serious.

In the heavy oil hydrogenation process of the present application, a liquid-phase reactor with specially designed structure is adopted, so that the viscosity of the reaction material is reduced in the lower cylinder, and then the reaction material is subjected to hydrogenation reaction while sequentially passing through the upper cylinder and the annular space, and therefore the mass transfer driving force and the reaction rate of the liquid-phase hydrogenation reaction of the heavy oil can be improved. Furthermore, by using a hydrogenation catalyst with a relatively higher activity in the upper cylinder and a hydrogenation catalyst with a relatively lower activity in the annular space, the contact time between the reaction material and the catalysts with different activities can be controlled, so that the coking on the catalyst surface can be mitigated, the deep cracking reaction of light oil can be reduced, the hydrogenation conversion rate of the heavy oil can be promoted, and the liquid yield and the impurity removal conversion rate of heavy oil of the liquid-phase hydrogenation reaction of the heavy oil process can be improved.

In particular, in the reactor, the cross-sectional area of the lower cylinder is gradually reduced from bottom to top, and its shell-and-tube structure improves the dissolution and dispersion amount and dispersion uniformity of hydrogen in the feedstock oil while reducing the viscosity of the material, so that the interfacial mass transfer resistance between hydrogen and oil can be reduced, and the hydrogenation reaction rate can be improved; the upper cylinder has a cross-sectional area that is gradually increased from bottom to top, so that the contact between the feedstock and the catalyst is gradually increased as the reaction progresses, and thus a more uniform temperature rise in the reaction process can be achieved, and the problems of concentrated heat release and coking on the surface of the catalyst can be prevented; the middle upper part of the wall of the upper cylinder is provided with openings, so that the reaction product in the upper cylinder can be timely diffused to the annular space after a certain residence time and achieving a certain conversion rate, and thus, on one hand, an excessive reaction of the material on the surface of the catalyst can be reduced, and on the other hand, the reaction heat can be timely taken away, and the occurrence of local hot spots can be prevented; a catalyst with higher activity is filled in the upper cylinder, so that the hydrogenation reaction rate in the early stage of the reaction can be further improved under the conditions of high impurity component concentration in the feeding material and low material viscosity; and a catalyst with lower activity is filled in the annular space, so that the coking of materials on the surface of the catalyst can be reduced under the condition of higher temperature in the later stage of the reaction process, and the cracking reaction can be reduced.

A preferred embodiment of the liquid-phase reactor of the present application, and a schematic flow scheme for a process for the hydrogenation of heavy oils using the same, are described below with reference to FIG. 1:

As shown in FIG. 1, in a preferred embodiment, the liquid-phase reactor of the present application comprises an outer cylinder, and an inner cylinder disposed along an axial direction of the reactor, the outer cylinder comprises a top head, a straight cylinder section 8 and a bottom head 10, an annular space 11 is formed between the inner cylinder and the outer cylinder, a top end of the inner cylinder is open and is in communication with the annular space 11, the inner cylinder comprises an upper cylinder 9 and a lower cylinder 5 sequentially from top to bottom. The upper cylinder 9 is positioned in the straight cylinder section 8, with its cross-sectional area being gradually reduced from top to bottom, its top end being open, and its bottom being in communication with the top of the lower cylinder 5. The lower cylinder is positioned in the bottom head 10, with its cross-sectional area being gradually increased from top to bottom, its bottom end being hermetically connected to the inner wall of the bottom head 10. An inorganic membrane tube 6 extending along the axial direction of the reactor is provided in the lower cylinder 5, so that a shell-and-tube structure is formed, and pores are provided in the tube wall of the inorganic membrane tube as a gas passage. The bottom head 10 is provided with a liquid inlet, a gas inlet and a product outlet, the liquid inlet and the gas inlet are in communication with the bottom of the lower cylinder 5, the product outlet is in communication with the bottom of the annular space 11, wherein the liquid inlet is in communication with one of the shell side and the tube side (preferably the tube side) of the shell-and-tube structure of the lower cylinder 5, while the gas inlet is in communication with the other of the shell side and the tube side (preferably the shell side) of the shell-and-tube structure. At a position between the top end of the upper cylinder 9 and the top head, such as at a suitable distance below the tangent of the top head of the reactor (as close as possible to the top head), a grid 16 is provided for blocking the catalyst from entering the space inside the top head and fixing the catalyst bed in the upper cylinder, but allowing the reaction material to pass through. The catalyst is disposed below the grid 16, and in order to achieve a full liquid-phase reaction, a liquid level control may be provided above the catalyst bed layer in the cylinder of the reactor so that the catalyst is completely immersed in the liquid phase space 21.

Figure 2:
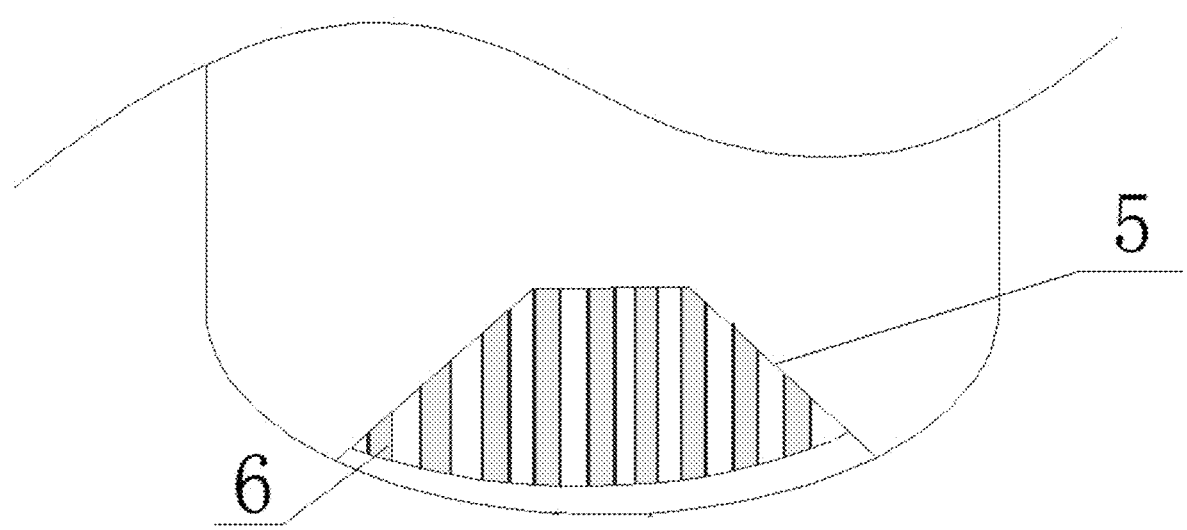
FIG. 2 shows an enlarged partial schematic diagram of the lower cylinder part of the reactor shown in FIG. 1.
Figure 3:
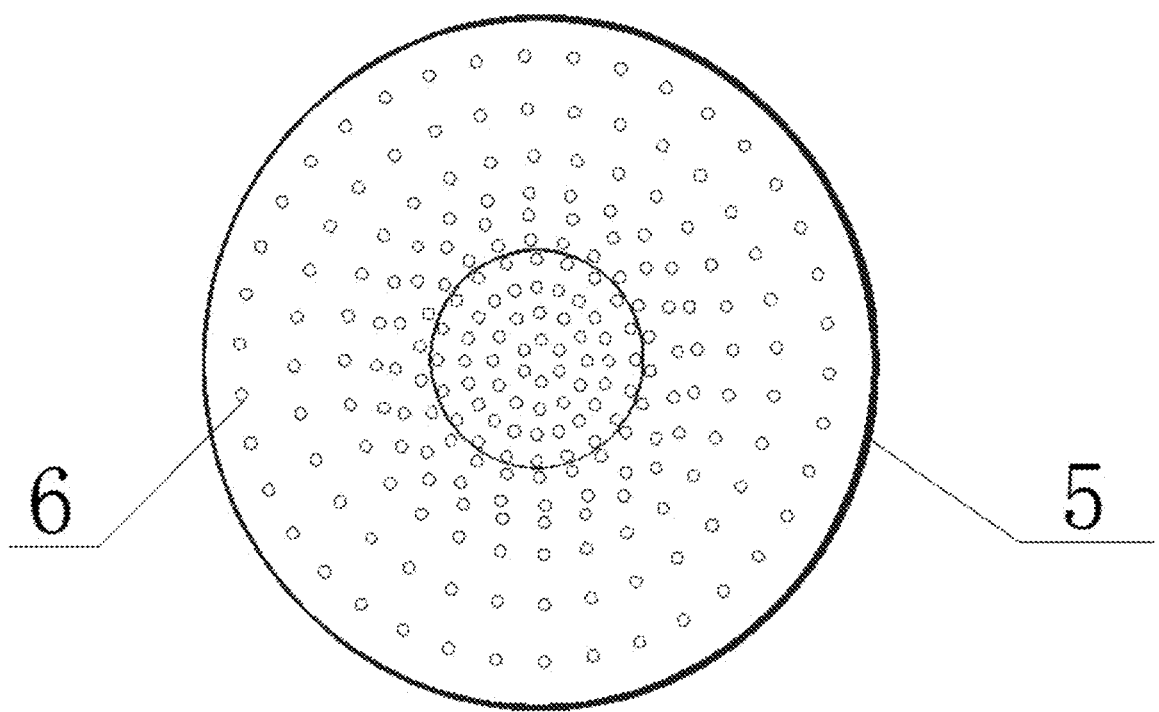
FIG. 3 shows a schematic bottom view of the lower cylinder part of the reactor shown in FIG. 1.

In a preferred embodiment, as shown in FIG. 2, a plurality of inorganic membrane tubes 6 extending along the axial direction of the reactor are provided in the lower cylinder 5 of the reactor according to the present application. The arrangement of the inorganic membrane tubes 6 is not particularly limited, and may be, for example, a circular arrangement as shown in FIG. 3.

In a preferred embodiment, when a liquid-phase reactor as shown in FIG. 1 is used for heavy oil hydrogenation, a heavy oil feedstock 2 and hydrogen gas 1 are mixed by a hydrogen-oil mixer 3 and then fed as a liquid feed 4 from the bottom of the liquid-phase reactor to the shell side of the shell-and-tube structure of the lower cylinder 5, and hydrogen gas is fed as a gas feed 7 to the tube side of the shell-and-tube structure of the lower cylinder 5 (i.e., inside the inorganic membrane tube 6). The liquid feed 4 is passed into the upper cylinder 9 after viscosity reduction, and is subjected to hydrogenation reaction during the process of flowing through the upper cylinder 9 from bottom to top in the presence of the first hydrogenation catalyst 17. The resulted partially hydrogenated reaction material can be diffused to the annular space 11 through the openings at the middle upper part of the upper cylinder wall 19, and can also be passed to the annular space 11 through the area in the upper seal head which is in communication with both the upper cylinder and the annular space. The reaction material entering the annular space 11 undergoes further hydrogenation reaction during the process of flowing through the annular space from top to bottom in the presence of the second hydrogenation catalyst 18. The final reaction product 12 obtained at the bottom of the annular space 11 is discharged from the liquid-phase reactor under the control of a discharge valve 13. The gas generated in the reaction process and the separated dissolved gas are gathered in a gas space 20 at the top of the outer cylinder of the reactor and are discharged as exhaust gas 14 under the control of a vent valve 15.

EXAMPLES

The present application will be further illustrated with reference to the following examples, but the present application is not limited thereto.

The feedstock oil 1 used in the comparative examples and examples of the present application is a mixed wax oil feedstock, of which the properties are shown in Table 1; feedstock oil 2 is a vacuum residue feedstock, of which the properties are shown in Table 2.

TABLE 1

Properties of the mixed wax oil feedstock

| Components | Analytical method | Mixed wax oil HVGO-1 | HVGO-2 |
|---|---|---|---|
| Mixing ratio, wt % | | 30.2 | 69.8 |
| True boiling point splitting range, ° C. | ASTM D 2892 | 510-566 | 510-567 |
| Specific gravity (60° F./60° F.) | ASTM D 1298 | 0.947 | 0.965 |
| Total sulfur, wt-% | ASTM D 1266 | 2.50 | 3.77 |
| Total nitrogen, wt-ppm | | 1290 | 1754 |
| Basic nitrogen, wt-ppm | | 312 | 478 |
| Viscosity, cSt @ 50° C. | ASTM D 445 | 346.4 | 815.4 |
| Viscosity, cSt @ 100° C. | ASTM D 445 | 31.8 | 50.7 |
| Distillation range, ° C. | ASTM D 1160 | | |
| 5 LV % | | 453 | 448 |
| 10 | | 474 | 476 |
| 30 | | 510 | 512 |
| 50 | | 530 | 532 |
| 70 | | 553 | 554 |
| 90 | | 585 | 585 |
| 95 | | 600 | 600 |
| 100 | | 632 | 631 |

TABLE 2

Properties of the vacuum residue feedstock

| Analyzed items | Vacuum residue |
|---|---|
| Density, g/m$^3$ | 991.4 |
| Viscosity (100° C.), mm$^2$/s | 611.3 |
| Carbon residue, % (wt) | 15.77 |
| Metal content, µg/g | 288 |
| Group composition | |
| Saturates, % | 22.45 |
| Aromatics, % | 35.16 |
| Resin, % | 34.79 |
| Asphaltenes, % | 7.6 |

Comparative Example 1

The mixed wax oil feedstock shown in the Table 1 was used as a feed for the hydrogenation reaction, a conventional gas, liquid and solid three-phase fixed bed hydrogenation reactor was used for hydrogenation, two catalyst beds of the same height were used, with each bed comprising commercially available FZC protective agent/3936/3996 catalysts developed by Fushun Research Institute of Petroleum and Petrochemical, wherein the FZC protective agent occupied 14% of the total height of the catalyst beds, and the 3936 and 3996 catalysts each occupied 43% of the total height of the catalyst beds.

The hydrogenation reaction conditions were as follows: a reaction temperature of 380-427° C., a reaction pressure of 15 MPaG, a liquid hourly space velocity of 0.72 h$^{-1}$, and a hydrogen-to-oil volume ratio at the inlet of the reactor of 400.

The temperature profile of the catalyst bed is shown in Table 3, and the properties of the liquid product are shown in Table 4.

Comparative Example 2

The mixed wax oil feedstock shown in Table 1 was used as a feed for the hydrogenation reaction, a gas, liquid and solid three-phase fixed bed hydrogenation reactor was used for hydrogenation, the reactor had a sleeve type structure and was divided into an outer cylinder and an inner cylinder, the inner cylinder was a straight cylinder, and the reaction feed was introduced into the inner cylinder and discharged from the outer cylinder. The diameter of the outer cylinder of the sleeve type reactor was 300 mm, and the diameter of the inner cylinder was 150 mm. The hydrogenation catalyst filled in the inner cylinder was commercially available FZC protective agent/3996 catalyst developed by Fushun Research Institute of Petroleum and Petrochemical, the hydrogenation catalyst filled in the outer cylinder was commercially available FZC protective agent/3936 catalyst developed by Fushun Research Institute of Petroleum and Petrochemical, wherein the FZC protective agent in the outer cylinder occupied 12% of the total catalyst volume in the upper cylinder, and the FZC protective agent in the annular space occupied 12% of the total catalyst volume in the annular space.

The amount of hydrogen contained in the feed to the bottom of the reactor was 9.10% of the mass of the feedstock oil (corresponding to a hydrogen-to-oil volume ratio of 469).

The reaction conditions in the inner cylinder of the reactor were as follows: a reaction temperature of 380-403° C., a reaction pressure of 15.2 MPaG, and a liquid hourly space velocity of the feedstock oil of 1.0 h$^{-1}$; the reaction conditions in the outer cylinder were as follows: a reaction temperature of 403-418° C., a reaction pressure of 14.9 MPaG, and a liquid hourly space velocity of the feedstock oil of 1.3 h$^{-1}$.

The mixed wax oil shown in Table 1 was used as the feedstock, the temperature profile of the catalyst in the outer and inner cylinders is shown in Table 3, and the properties of the liquid product are shown in Table 5.

Example 1

An experiment was carried out in accordance with the flow scheme shown in FIG. 1, the first hydrogenation catalyst filled in the upper cylinder of the liquid-phase reactor was commercially available FZC protective agent/3996 catalyst developed by Fushun Research Institute of Petroleum and Petrochemical, and the second hydrogenation catalyst filled in the annular space was commercially available FZC protective agent/3936 catalyst developed by Fushun Research Institute of Petroleum and Petrochemical, wherein the FZC protective agent in the upper cylinder occupied 14% of the total catalyst volume in the upper cylinder, and the FZC protective agent in the annular space occupied 14% of the total catalyst volume in the annular space. The hydrogen content in the liquid feed to the reactor was 2.0% of the mass of the feedstock oil (the sum of fresh feedstock oil and cycle oil); the amount of hydrogen introduced in the lower cylinder of the reactor was 3.10% of the mass of the feedstock oil (the sum of fresh feedstock oil and cycle oil) (corresponding to a hydrogen-to-oil volume ratio of 273); and the recycle ratio (i.e., the mass ratio of the cycle oil to the fresh feedstock oil) was 2.5.

The reaction conditions in the upper cylinder of the reactor were as follows: a reaction temperature of 380-393° C., a reaction pressure of 15.0 MPaG, and a liquid hourly volume space velocity of fresh feedstock oil of 1.2 h$^{-1}$; the reaction conditions in the annular space were as follows: a reaction temperature of 393-402° C., a reaction pressure of 14.5 MPaG, and a liquid hourly space velocity of fresh feedstock oil of 1.6 h$^{-1}$.

The ratio of the maximum cross-sectional diameter (i.e., the diameter of the top plane) of the upper cylinder of the reactor to the diameter of the reactor was 1:1.5, and the ratio of the maximum cross-sectional diameter of the upper cylinder to the minimum cross-sectional diameter of the upper cylinder was 4:1; the upper part of the wall of the upper cylinder at a distance from the bottom end of the upper cylinder that was at least ⅔ of the total vertical height of the upper cylinder were uniformly provided with round holes with a diameter of 10 mm and an opening ratio of 85%; the ratio of the maximum cross-sectional diameter of the lower cylinder to the diameter of the reactor was 1:2.5, and the ratio of the maximum cross-sectional diameter of the lower cylinder to the minimum cross-sectional diameter of the lower cylinder was 2.4:1.

The mixed wax oil shown in Table 1 was used as the feedstock, and the temperature profile of the catalyst in the upper cylinder and the annular space was shown in Table 3, and the properties of the liquid product were shown in Table 5.

Example 2

An experiment was carried out in accordance with the flow scheme shown in FIG. 1, the first hydrogenation catalyst filled in the upper cylinder of the liquid-phase reactor was commercially available FZC protective agent/FF-26 catalyst developed by Fushun Research Institute of Petroleum and Petrochemical, and the second hydrogenation catalyst filled in the annular space was commercially available FZC protective agent/3996 catalyst developed by Fushun Research Institute of Petroleum and Petrochemical, wherein the FZC protective agent in the upper cylinder occupied 15% of the total catalyst volume in the upper cylinder, and the FZC protective agent in the annular space occupied 15% of the total catalyst volume in the annular space. The hydrogen content in the liquid feed to the reactor was 1.62% of the mass of the feedstock oil (the sum of fresh feedstock oil and cycle oil); the amount of hydrogen introduced in the lower cylinder of the reactor was 3.30% of the mass of the feedstock oil (the sum of fresh feedstock oil and cycle oil) (corresponding to a hydrogen-to-oil volume ratio of 253); the recycle ratio was 2.0.

The reaction conditions in the upper cylinder of the reactor were as follows: a reaction temperature of 380-393° C., a reaction pressure of 15.0 MPaG, and a liquid hourly volume space velocity of fresh feedstock oil of 1.0 $h^{-1}$; the reaction conditions in the annular space were as follows: a reaction temperature of 394-405° C., a reaction pressure of 14.5 MPaG, and a liquid hourly space velocity of fresh feedstock oil of 1.8 $h^{-1}$.

The ratio of the maximum cross-sectional diameter of the upper cylinder of the reactor to the diameter of the reactor was 1:2, and the ratio of the maximum cross-sectional diameter of the upper cylinder to the minimum cross-sectional diameter of the upper cylinder was 3:1; the upper part of the wall of the upper cylinder at a distance from the bottom end of the upper cylinder that was at least ½ of the total vertical height of the upper cylinder were uniformly provided with round holes with a diameter of 8 mm and an opening ratio of 80%; the ratio of the maximum cross-sectional diameter of the lower cylinder to the diameter of the reactor was 1:2.5, and the ratio of the maximum cross-sectional diameter of the lower cylinder to the minimum cross-sectional diameter of the lower cylinder was 2.4:1.

The mixed wax oil shown in Table 1 was used as the feedstock, the temperature profile of the catalyst in the upper cylinder and the annular space was shown in Table 3, and the properties of the liquid product were shown in Table 6.

Example 3

An experiment was carried out in accordance with the flow scheme shown in FIG. 1, the first hydrogenation catalyst filled in the upper cylinder of the liquid-phase reactor was commercially available FZC protective agent/FF-46 catalyst developed by Fushun Research Institute of Petroleum and Petrochemical, the second hydrogenation catalyst filled in the annular space was commercially available FZC protective agent/FF-26 catalyst developed by Fushun Research Institute of Petroleum and Petrochemical, and the FZC protective agent in the upper cylinder and that in the annular space each occupied 15% of the total catalyst volume of the corresponding area. The hydrogen content in the liquid feed to the reactor was 1.60% of the mass of the feedstock oil (the sum of fresh feedstock oil and cycle oil); the amount of hydrogen introduced in the lower cylinder of the reactor was 3.15% of the mass of the feedstock oil (the sum of fresh feedstock oil and cycle oil) (corresponding to a hydrogen-to-oil volume ratio of 245); the recycle ratio was 2.0.

The reaction conditions in the upper cylinder of the reactor were as follows: a reaction temperature of 378-390° C., a reaction pressure of 15.0 MPaG, and a liquid hourly volume space velocity of fresh feedstock oil of 1.0 $h^{-1}$; the reaction conditions in the annular space were as follows: a reaction temperature of 391-400° C., a reaction pressure of 14.5 MPaG, and a liquid hourly space velocity of fresh feedstock oil of 1.8 $h^{-1}$.

The ratio of the maximum cross-sectional diameter of the upper cylinder of the reactor to the diameter of the reactor was 1:1.5, and the ratio of the maximum cross-sectional diameter of the upper cylinder to the minimum cross-sectional diameter of the upper cylinder was 4:1; the upper part of the wall of the upper cylinder at a distance from the bottom end of the upper cylinder that was at least ⅔ of the total vertical height of the upper cylinder were uniformly provided with round holes with a diameter of 6 mm and an opening ratio of 80%; the ratio of the maximum cross-sectional diameter of the lower cylinder to the diameter of the reactor was 1:3, and the ratio of the maximum cross-sectional diameter of the lower cylinder to the minimum cross-sectional diameter of the lower cylinder was 2:1.

The mixed wax oil shown in Table 1 was used as the feedstock, the temperature profile of the catalyst in the upper cylinder and the annular space was shown in Table 3, and the properties of the liquid product were shown in Table 7.

Example 4

An experiment was carried out in accordance with the flow scheme shown in FIG. 1, the first hydrogenation catalyst filled in the upper cylinder of the liquid-phase reactor was commercially available FZC protective agent/FF-46 catalyst developed by Fushun Research Institute of Petroleum and Petrochemical, the second hydrogenation catalyst filled in the annular space was commercially available FZC protective agent/FF-26 catalyst developed by Fushun Research Institute of Petroleum and Petrochemical, and the FZC protective agent in the upper cylinder and that in the annular space each occupied 35% of the total catalyst volume in the corresponding area. The hydrogen content in the liquid feed to the reactor was 4.20% of the mass of the feedstock oil (the sum of fresh feedstock oil and cycle oil);

the amount of hydrogen introduced in the lower cylinder of the reactor was 7.96% of the mass of the feedstock oil (the sum of fresh feedstock oil and cycle oil) (corresponding to a hydrogen-to-oil volume ratio of 410); the recycle ratio was 2.0.

The reaction conditions in the upper cylinder of the reactor were as follows: a reaction temperature of 380-394° C., a reaction pressure of 15.0 MPaG, and a liquid hourly volume space velocity of fresh feedstock oil of 2.5 h$^{-1}$; the reaction conditions in the annular space were as follows: a reaction temperature of 393-406° C., a reaction pressure of 14.5 MPaG, and a liquid hourly space velocity of fresh feedstock oil of 0.5 h$^{-1}$.

The ratio of the maximum cross-sectional diameter of the upper cylinder of the reactor to the diameter of the reactor was 1:2, and the ratio of the maximum cross-sectional diameter of the upper cylinder to the minimum cross-sectional diameter of the upper cylinder was 2.5:1; the upper part of the wall of the upper cylinder at a distance from the bottom end of the upper cylinder that was at least ½ of the total vertical height of the upper cylinder were uniformly provided with round holes with a diameter of 10 mm and an opening ratio of 75%; the ratio of the maximum cross-sectional diameter of the lower cylinder to the diameter of the reactor was 1:2, and the ratio of the maximum cross-sectional diameter of the lower cylinder to the minimum cross-sectional diameter of the lower cylinder was 2.5:1.

The vacuum residue shown in Table 2 was used as the feedstock, and the temperature profile of the catalyst in the upper cylinder and the annular space is shown in Table 3, and the properties of the product are shown in Table 8.

TABLE 3

Temperature profile of catalysts for Comparative Examples 1-2 and Examples 1-4

| Name | First bed/ upper cylinder, ° C. | Second bed/ annular space, ° C. | First bed/ temperature rise in upper cylinder ° C. | Second bed/ temperature rise in annular space, ° C. |
| --- | --- | --- | --- | --- |
| Comparative Example 1 | Inlet: 380 Outlet: 410 | Inlet: 410 Outlet: 427 | 30 | 17 |
| Comparative Example 2 | Inlet: 380 Outlet: 408 | Inlet: 408 Outlet: 426 | 23 (inner cylinder) | 15 (outer cylinder) |
| Example 1 | Inlet: 380 Outlet: 393 | Inlet: 393 Outlet: 402 | 12 | 9 |
| Example 2 | Inlet: 380 Outlet: 393 | Inlet: 394 Outlet: 405 | 13 | 11 |
| Example 3 | Inlet: 378 Outlet: 390 | Inlet: 391 Outlet: 400 | 12 | 9 |
| Example 4 | Inlet: 380 Outlet: 394 | Inlet: 393 Outlet: 406 | 14 | 9 |

TABLE 4

Properties of the liquid product of Comparative Example 1

| Item | Method | Crude naphtha | Diesel oil | Tail oil |
| --- | --- | --- | --- | --- |
| True boiling point splitting range | | <165° C. | 165-360° C. | >360° C. |
| Yield (wt %) | | 42.4 | 25.8 | 21.6 |
| Specific gravity (60° F./60° F.) | ASTM D 1298 | 0.7575 | 0.8548 | 0.9029 |
| Total sulfur, wt-ppm | ASTM D 1266 | <55 | <350 | 1180 |
| Mercaptan sulfur, wt-ppm | | <50 | <50 | <50 |
| Total nitrogen, wt-ppm | | <15 | <50 | 255 |
| Distillation range, ° C. | ASTM | D 2892 | D 2892 | D 1160 |
| IBP/10% | | 60/83 | 175/200 | 345/377 |
| 30%/50% | | 95/105 | 247/280 | 408/451 |
| 70%/90% | | 114/132 | 295/308 | 505/564 |
| 95% | | 148 | 312 | 635 |

TABLE 4

Properties of the liquid product of Comparative Example 2

| Item | Method | Crude naphtha | Diesel oil | Tail oil |
| --- | --- | --- | --- | --- |
| True boiling point splitting range | | <165° C. | 165-360° C. | >360° C. |
| Yield (wt %) | | 44.3 | 28.8 | 16.8 |
| Specific gravity (60° F./60° F.) | ASTM D 1298 | 0.7573 | 0.8545 | 0.9026 |
| Total sulfur, wt-ppm | ASTM D 1266 | <30 | <200 | 800 |
| Mercaptan sulfur, wt-ppm | | <25 | <15 | <50 |
| Total nitrogen, wt-ppm | | <15 | <30 | <150 |
| Distillation range, ° C. | ASTM | D 2892 | D 2892 | D 1160 |
| IBP/10% | | 60/83 | 175/200 | 345/377 |
| 30%/50% | | 95/105 | 247/280 | 408/451 |
| 70%/90% | | 114/132 | 295/308 | 505/564 |
| 95% | | 145 | 317 | 638 |

TABLE 5

Properties of the liquid product of Example 1

| Item | Method | Crude naphtha | Diesel oil | Tail oil |
| --- | --- | --- | --- | --- |
| True boiling point splitting range | | <165° C. | 165-360° C. | >360° C. |
| Yield (wt %) | | 47.7 | 35.8 | 11.2 |
| Specific gravity (60° F./60° F.) | ASTM D 1298 | 0.7574 | 0.8548 | 0.9031 |
| Total sulfur, wt-ppm | ASTM D 1266 | <15 | <150 | <500 |
| Mercaptan sulfur, wt-ppm | | <10 | <10 | <10 |
| Total nitrogen, wt-ppm | | <10 | <10 | <100 |
| Distillation range, ° C. | ASTM | D 2892 | D 2892 | D 1160 |
| IBP/10% | | 60/85 | 175/208 | 345/380 |
| 30%/50% | | 97/108 | 254/288 | 406/457 |
| 70%/90% | | 110/135 | 298/308 | 512/564 |
| 95% | | 147 | 310 | 635 |

TABLE 6

Properties of the liquid product of Example 2

| Item | Method | Crude naphtha | Diesel oil | Tail oil |
| --- | --- | --- | --- | --- |
| True boiling point splitting range | | <165° C. | 165-360° C. | >360° C. |
| Yield (wt %) | | 48.2 | 37.4 | 9.2 |
| Specific gravity (60° F./60° F.) | ASTM D 1298 | 0.7573 | 0.8549 | 0.9028 |
| Total sulfur, wt-ppm | ASTM D 1266 | <15 | <150 | <500 |

TABLE 6-continued

Properties of the liquid product of Example 2

| Item | Method | Crude naphtha | Diesel oil | Tail oil |
|---|---|---|---|---|
| Mercaptan sulfur, wt-ppm | | <10 | <10 | <10 |
| Total nitrogen, wt-ppm | | <10 | <10 | <100 |
| Distillation range, ° C. | ASTM | D 2892 | D 2892 | D 1160 |
| IBP/10% | | 60/85 | 175/209 | 355/380 |
| 30%/50% | | 98/107 | 254/288 | 408/457 |
| 70%/90% | | 118/137 | 296/308 | 513/566 |
| 95% | | 148 | 311 | 634 |

TABLE 7

Properties of the liquid product of Example 3

| Item | Method | Crude naphtha | Diesel oil | Tail oil |
|---|---|---|---|---|
| True boiling point splitting range | ASTM D 2892 | <165° C. | 165-360° C. | >360° C. |
| Yield (wt %) | | 47.5 | 39.4 | 8.7 |
| Specific gravity (60° F./60° F.) | ASTM D 1298 | 0.7573 | 0.8549 | 0.9028 |
| Total sulfur, wt-ppm | ASTM D 1266 | <15 | <150 | <500 |
| Mercaptan sulfur, wt-ppm | | <10 | <10 | <10 |
| Total nitrogen, wt-ppm | | <10 | <10 | <100 |
| Distillation range, ° C. | ASTM | D 2892 | D 2892 | D 1160 |
| IBP/10% | | 60/86 | 175/222 | 355/380 |
| 30%/50% | | 96/108 | 255/289 | 409/456 |
| 70%/90% | | 118/134 | 295/308 | 515/564 |
| 95% | | 148 | 311 | 635 |

TABLE 8

Properties of the liquid product of Example 4

| Analyzed item | Residue hydrogenation product |
|---|---|
| Metal content (Ni + V), μg/g | 3.43 |
| Metal conversion rate, % | 98.11 |
| Yield (wt %) | Dry gas: 9.8; Liquefied gas: 10.7%; Naphtha: 2.6% Gasoline: 36.4%; Diesel oil: 35.8%; Oil slurry: 4.7% |

It can be seen from the temperature profile of catalysts and hydrogenation results of Examples 1-3 and Comparative Examples 1-2 that the liquid-phase reactor and heavy oil hydrogenation method of the present application can effectively improve the mass transfer driving force and reaction rate of the liquid-phase hydrogenation reaction of heavy oils by subjecting the heavy oil feedstock first to viscosity reduction in the lower cylinder by means of finely dispersed hydrogen and then to hydrogenation reaction, and the upper cylinder has a structure with a gradually increasing cross-sectional area from bottom to top, so that the contact area between the feedstock and the catalyst is gradually increased with the progress of the reaction, and it can be seen from the temperature rise of the catalyst in the upper cylinder that the temperature rise is greatly reduced, and thus the temperature rise in the reaction process is controlled to be more uniform, and the problems of concentrated heat release and coking on the surface of the catalyst can be prevented. In addition, because the middle upper part of the wall of the upper cylinder is provided with openings, the reaction product in the upper cylinder can be timely diffused to the annular space after a certain residence time and achieving a certain conversion rate, and thus, on one hand, an excessive reaction of the material on the surface of the catalyst can be reduced, and on the other hand, the reaction heat can be timely taken away, and the occurrence of local hot spots can be prevented; the lower cylinder not only has a function of viscosity reduction, but also can improve the dissolution and dispersion amount and the dispersion uniformity of hydrogen in the feedstock oil, reduce the interfacial mass transfer resistance between hydrogen and oil and improve the hydrogenation reaction rate.

Comparing the results of Examples 1-3 with those of Comparative Examples 1-2, it can be seen that the content of impurities such as total sulfur, mercaptan sulfur and total nitrogen in the products obtained in Examples 1-3 is greatly reduced with a certain improvement in the liquid product distribution. This clearly shows that the reactor and process of the present application can achieve the desired deep hydrogenation conversion rate without excessive cracking reactions, using milder conditions with a product distribution that is better than in the prior art. From the results of Example 4, it can be seen that the reactor and process of the present application can achieve a desired demetallization effect and demetallization conversion under conventional reaction conditions and at higher space velocities. This clearly shows that, by using the reactor and process of the present application, milder reaction conditions can be employed to obtain a demetallization conversion rate equivalent to those achieved by the prior art, thereby further reducing cracking reactions and increasing the liquid product yield.

The invention claimed is:

1. A liquid-phase reactor, comprising an outer cylinder, and an inner cylinder disposed along an axial direction of the reactor,
wherein the outer cylinder comprises a top head, a straight cylinder section and a bottom head, an annular space is formed between the inner cylinder and the outer cylinder, a top end of the inner cylinder is open and in communication with the annular space,
wherein the inner cylinder comprises an upper cylinder and a lower cylinder,
the upper cylinder is disposed in the straight cylinder section, a cross-sectional area of the upper cylinder gradually reduces from top to bottom, a top end of the upper cylinder is open, and a bottom of the upper cylinder is in communication with a top of the lower cylinder;
the lower cylinder is disposed in the bottom head, a cross-sectional area of the lower cylinder gradually increases from top to bottom, and a bottom end of the lower cylinder is hermetically connected to an inner wall of the bottom head, an inorganic membrane tube extending along the axial direction of the reactor is disposed in the lower cylinder to form a shell-and-tube structure, and the inorganic membrane tube has pores in a tube wall thereof;
the bottom head is provided with a liquid inlet, a gas inlet, and a product outlet, the liquid inlet and the gas inlet are in communication with the bottom end of the lower cylinder, and the product outlet is in communication with a bottom of the annular space, wherein a shell side and a tube side of the shell-and-tube structure of the lower cylinder are connected to the liquid inlet and the gas inlet, respectively, or are connected to the gas inlet and the liquid inlet, respectively.

2. The liquid-phase reactor according to claim 1, wherein a plurality of openings having an aperture size of about 0.1-50 mm are disposed in an upper cylinder wall at an opening ratio of about 30-95% relative to the area the upper cylinder wall.

3. The liquid-phase reactor according to claim 1, wherein a ratio of a vertical height of the portion of the upper cylinder wall having the plurality of openings to a total vertical height of the upper cylinder wall is about 1:1.5 to about 1:20.

4. The liquid-phase reactor according to claim 1, wherein the upper cylinder has a frustoconical shape with a cross-sectional area gradually decreasing from top to bottom, a ratio of the maximum cross-sectional diameter of the upper cylinder to the diameter of the reactor is about 1:1.05 to about 1:50, and a ratio of the minimum cross-sectional diameter of the upper cylinder to the maximum cross-sectional diameter of the upper cylinder is about 1:1.1 to about 1:30.

5. The liquid-phase reactor according to claim 1, wherein the lower cylinder has a frustoconical shape with a cross-sectional area gradually decreasing from bottom to top, a ratio of the maximum cross-sectional diameter of the lower cylinder to the diameter of the reactor is about 1:1.05 to about 1:50, and a ratio of the minimum cross-sectional diameter of the lower cylinder to the maximum cross-sectional diameter of the lower cylinder is about 1:1.1 to about 1:30.

6. The liquid-phase reactor according to claim 1, wherein the pores in the tube wall of the inorganic membrane tube have an average pore size of about 0.5-200 nm.

7. The liquid-phase reactor according to claim 1, wherein the upper cylinder, the annular space, or both are filled with a catalyst.

8. A process for hydrogenation of heavy oils in a liquid-phase reactor according to claim 7, comprising the steps of:
   (1) feeding a heavy oil feedstock via the liquid inlet to the shell side of the shell-and-tube structure of the lower cylinder, and introducing a hydrogen gas via the gas inlet to the tube side of the shell-and-tube structure, to produce a hydrogen-containing reaction material having a reduced viscosity as compared to the heavy oil feedstock at the top of the lower cylinder;
   (2) feeding the reaction material to the bottom of the upper cylinder, whereby the reaction material is subject to a first hydrogenation reaction while passing through the upper cylinder from bottom to top in the presence of a first hydrogenation catalyst filled therein to obtain a partially hydrogenated reaction material; and
   (3) feeding the partially hydrogenated reaction material to the annular space, whereby the partially hydrogenated reaction material is subject to a second hydrogenation reaction while passing through the annular space from top to bottom in the presence of a second hydrogenation catalyst filled therein to obtain a hydrogenated reaction product, wherein the second hydrogenation catalyst is the same as or different from the first hydrogenation catalyst.

9. The process according to claim 8, wherein a volume ratio of hydrogen fed ($Nm^3/h$) to the heavy oil feedstock fed ($m^3/h$) in step (1) is from about 1500:1 to about 1:1.

10. The process according to claim 8, wherein the first hydrogenation reaction is carried out at a reaction temperature of about 60-500° C., a reaction pressure of about 0.5-20.0 MPa, and a liquid hourly space velocity of fresh feed of about 0.01-10.0 $h^{-1}$.

11. The process according to claim 8, wherein the second hydrogenation reaction is carried out at a reaction temperature of about 120-550° C., a reaction pressure of about 0.5-20.0 MPa, and a liquid hourly space velocity of fresh feed of about 0.1-10.0 $h^{-1}$.

12. The process according to claim 8, wherein an activity of the first hydrogenation catalyst is higher than an activity of the second hydrogenation catalyst.

13. The process according to claim 8, wherein the first and second hydrogenation catalysts each independently comprises about 45-95 wt % of a carrier and about 5-55 wt % of an active component, wherein the active component is one or more selected from Group VIB and Group VIII metal elements, and the carrier is alumina or silicon-containing alumina.

14. The liquid-phase reactor according to claim 1, wherein the liquid inlet is in communication with the shell side of the shell-and-tube structure of the lower cylinder, and the gas inlet is in communication with the tube side of the shell-and-tube structure.

15. The liquid-phase reactor according to claim 2, wherein a vertical distance between a part of the upper cylinder wall having the plurality of openings and the bottom of the upper cylinder is not less than about ⅓ of a vertical height of the upper cylinder.

16. The liquid-phase reactor according to claim 2, wherein a vertical distance between a part of the upper cylinder wall having the plurality of openings and the bottom of the upper cylinder is not less than about ½ of a vertical height of the upper cylinder.

17. The liquid-phase reactor according to claim 7, wherein the upper cylinder is filled with a first catalyst and the annular space is filled with a second catalyst, the first catalyst and the second catalyst being the same or different.

18. The process according to claim 12, wherein a ratio of the activity of the first hydrogenation catalyst to the activity of the second hydrogenation catalyst is from about 1.05:1 to about 10:1.

19. The process according to claim 13, wherein the first and second hydrogenation catalysts each independently comprises about 5-40 wt % of a Group VIB metal element and about 3-15 wt % of a Group VIII metal element, calculated as oxides and based on a total weight of the hydrogenation catalyst.

20. The process according to claim 8, wherein the heavy oil feedstock is pre-mixed with hydrogen.

* * * * *